United States Patent [19]
Peebles, Jr. et al.

[11] Patent Number: 4,521,234
[45] Date of Patent: Jun. 4, 1985

[54] HOUSING FOR HIGH EFFICIENCY PARTICULATE AIR FILTERS

[75] Inventors: William C. Peebles, Jr.; Cecil W. Bowers, both of Washington, N.C.

[73] Assignee: Flanders Filters, Inc., Washington, N.C.

[21] Appl. No.: 515,370

[22] Filed: Jul. 19, 1983

[51] Int. Cl.$^3$ .............................................. B01D 46/00
[52] U.S. Cl. ........................................ 55/481; 55/493; 55/502; 55/DIG. 9
[58] Field of Search ................. 55/480, 481, 484, 493, 55/490, 502, 500, 504, DIG. 9

[56] References Cited

U.S. PATENT DOCUMENTS

| | | | |
|---|---|---|---|
| 3,383,841 | 5/1968 | Olson et al. | 55/481 |
| 3,393,498 | 7/1968 | Schoen | 55/493 |
| 3,423,908 | 1/1969 | Hart . | |
| 3,507,100 | 4/1970 | Neumann . | |
| 3,593,503 | 7/1971 | Andrews . | |
| 3,630,008 | 12/1971 | Revell | 55/493 |
| 3,816,984 | 6/1974 | Neumann . | |
| 3,993,464 | 11/1976 | Pelabon . | |
| 4,324,568 | 4/1982 | Wilcox et al. . | |
| 4,334,900 | 6/1982 | Neumann | 55/DIG. 9 |
| 4,450,964 | 5/1984 | Wood | 55/DIG. 9 |

OTHER PUBLICATIONS

"E-4 Bag-Out Containment Housings", Bulletin No. 2811A, 35 pages, published 1981 by Flanders Filters, Inc.

Primary Examiner—Bernard Nozick
Attorney, Agent, or Firm—Bell, Seltzer, Park & Gibson

[57] ABSTRACT

A housing for HEPA filters is disclosed, which includes a side access opening for receiving one or more filters, and a filter clamping assembly for seating and unseating each of the filters against its seal. The clamping assembly comprises a pair of filter clamping mechanisms extending transversely across the interior of the housing and along the top and bottom side walls, respectively. Also, a handle is pivotally mounted between the two clamping mechanisms adjacent the opening, and the handle is connected to each clamping mechanism such that rotation of the handle serves to actuate the mechanisms. In one embodiment, the handle is releasably connected to the two mechanisms, and the mechanisms are releasably mounted to the top and bottom side walls, whereby the entire assembly may be disassembled and removed from the housing through the side access opening to permit the repair or replacement of a defective component. In another embodiment, the entire clamping assembly comprises an interconnected unit, which is releasably mounted in the housing. The invention finds particular utility in the case of housings used for the cleaning of exhaust airstreams containing potentially dangerous substances, and wherein the components of the clamping assembly may be removed and replaced through the side access opening in the housing by the bag-in, bag-out procedure.

18 Claims, 15 Drawing Figures

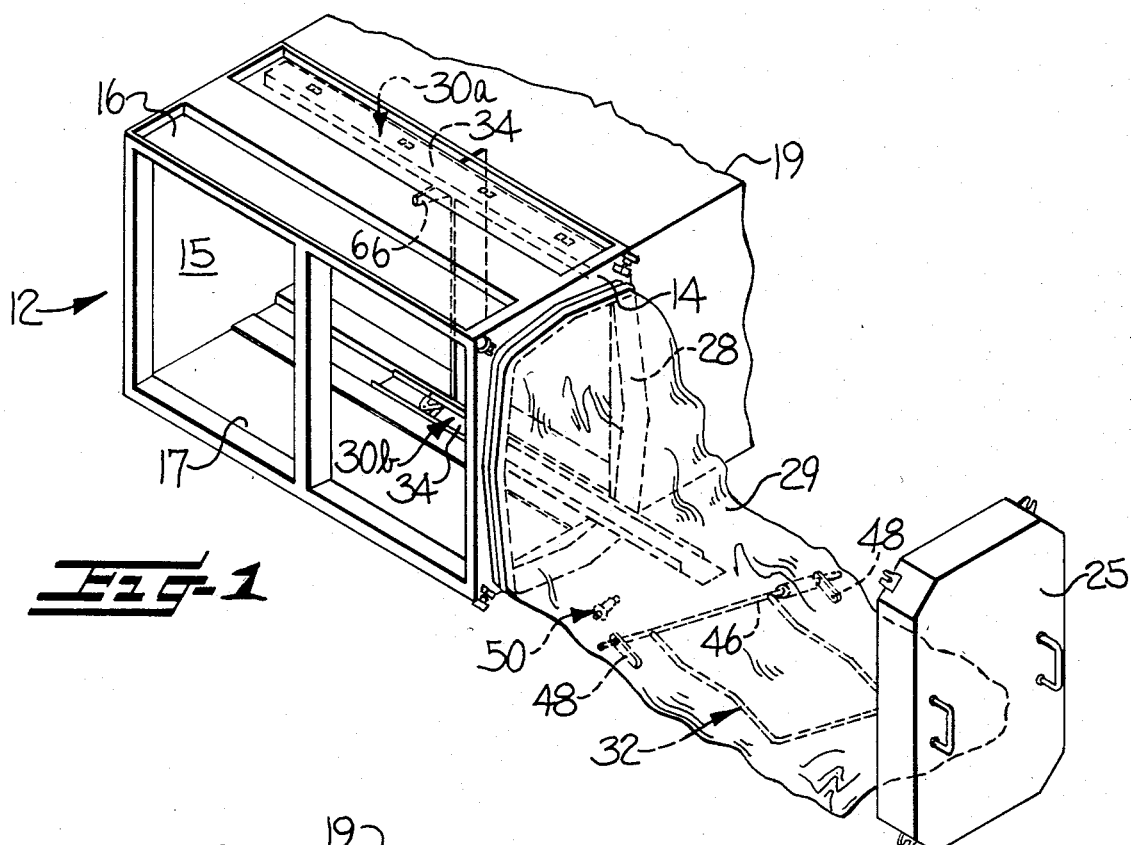
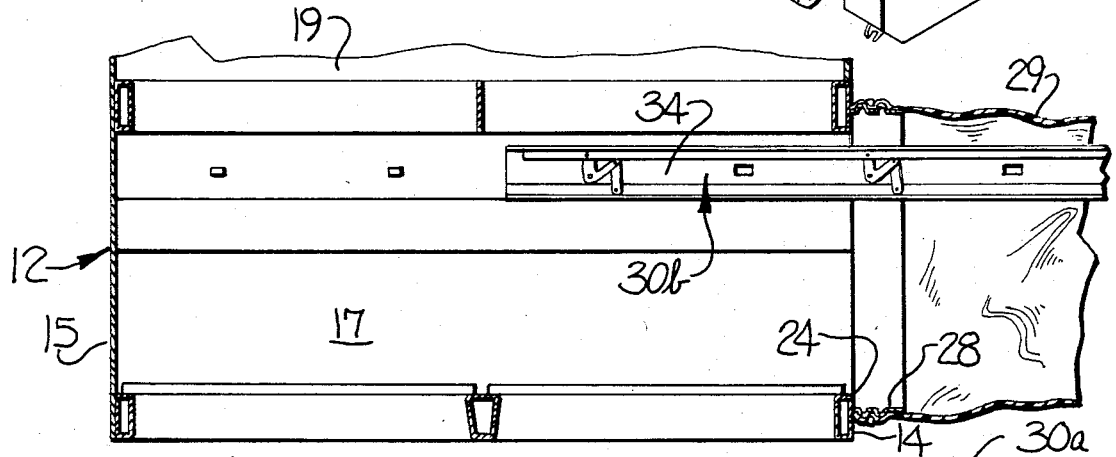
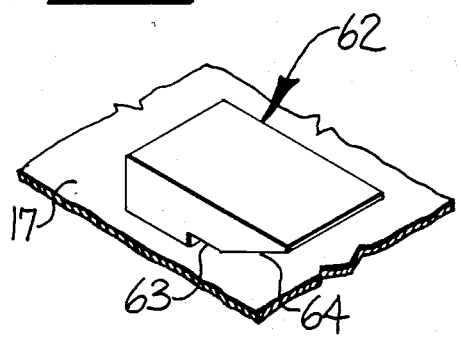
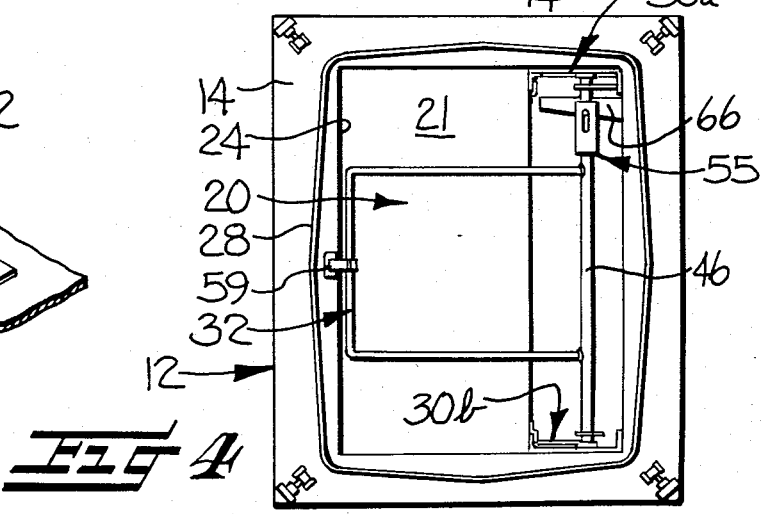

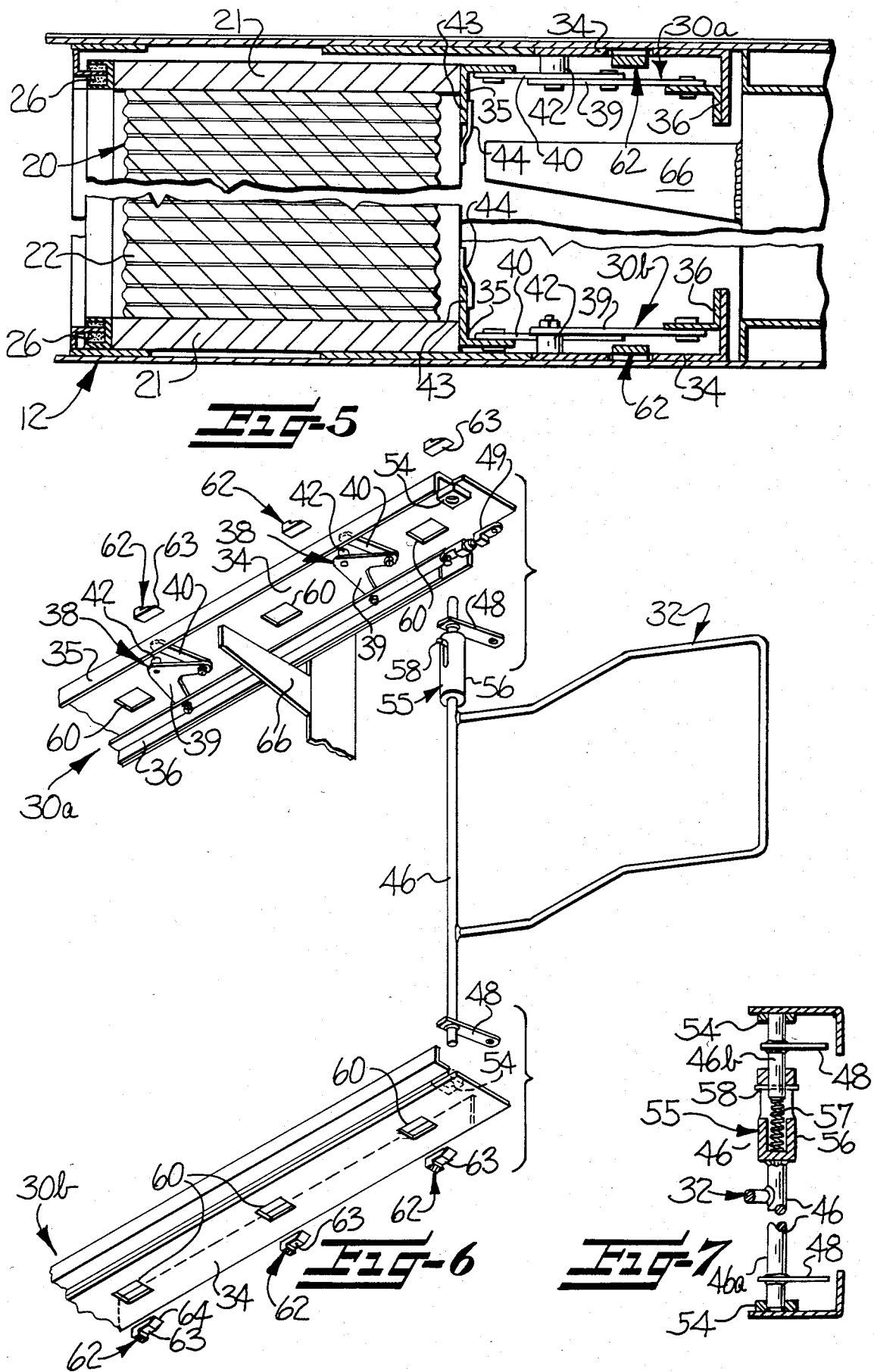

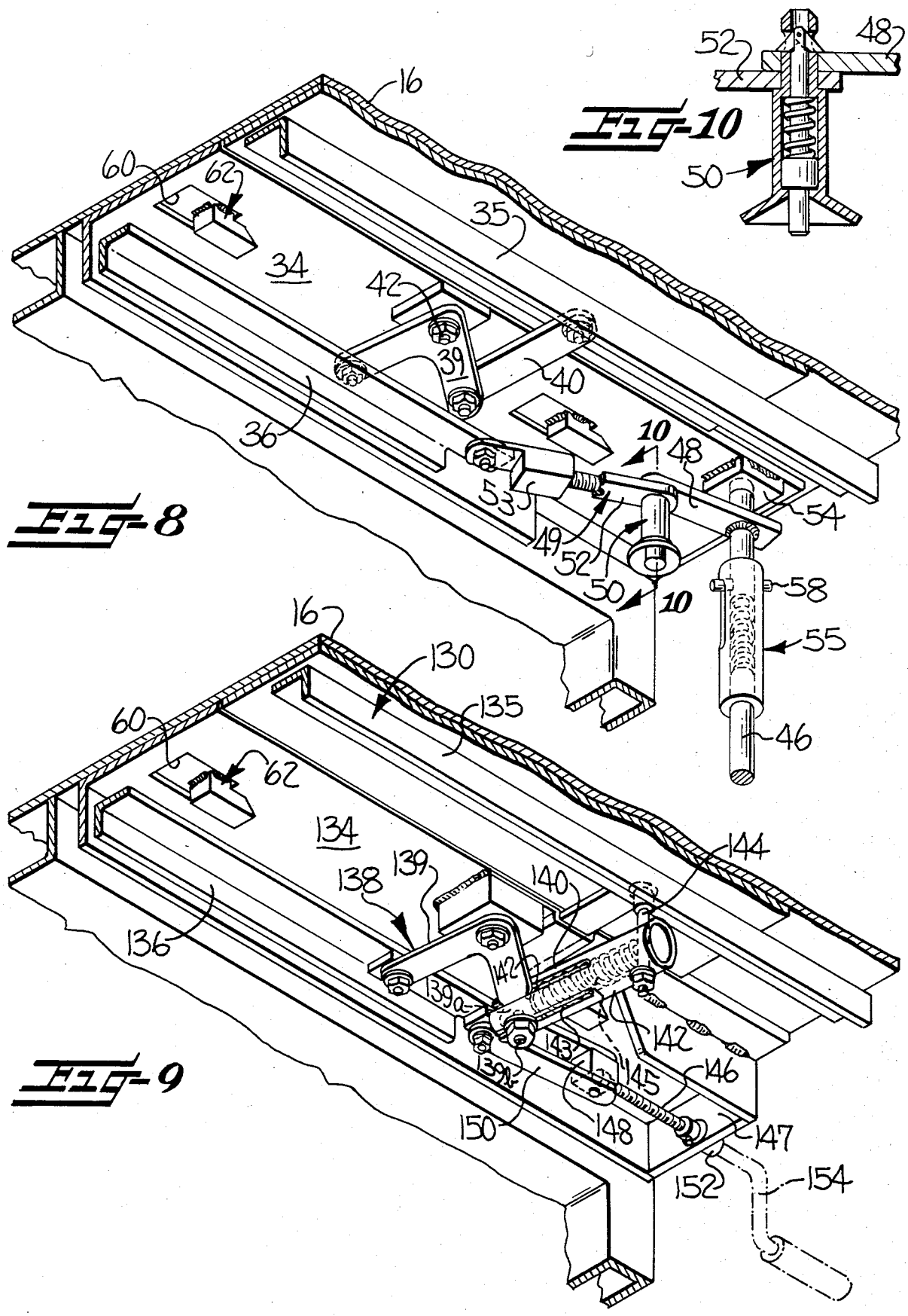

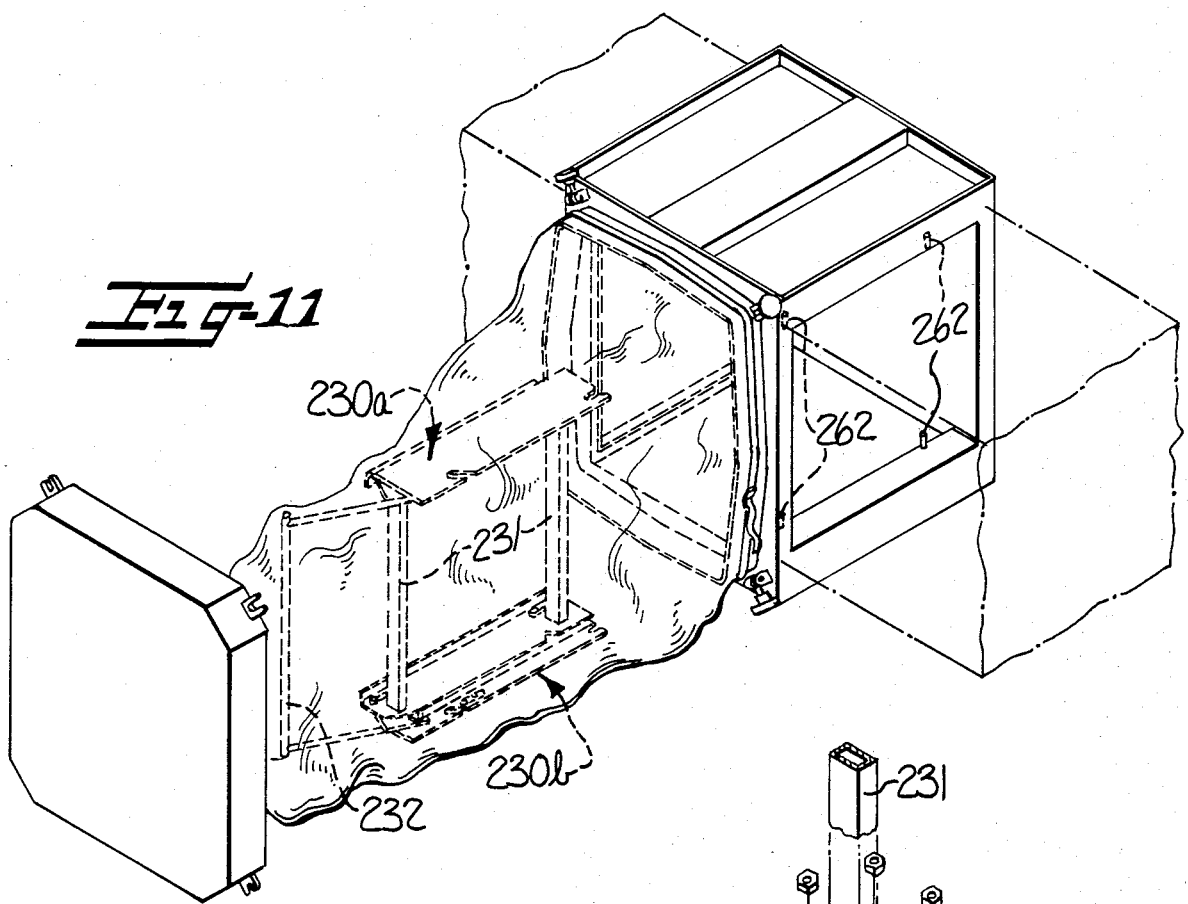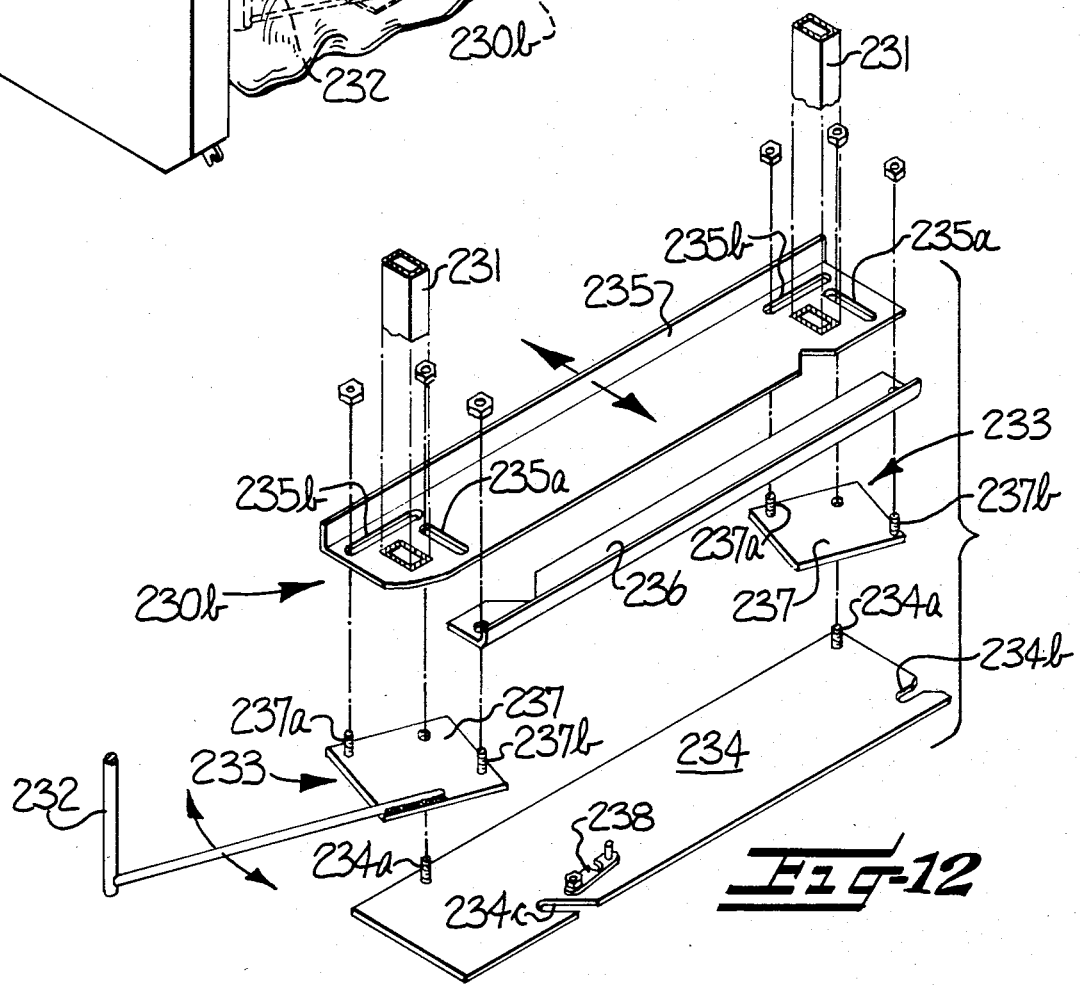

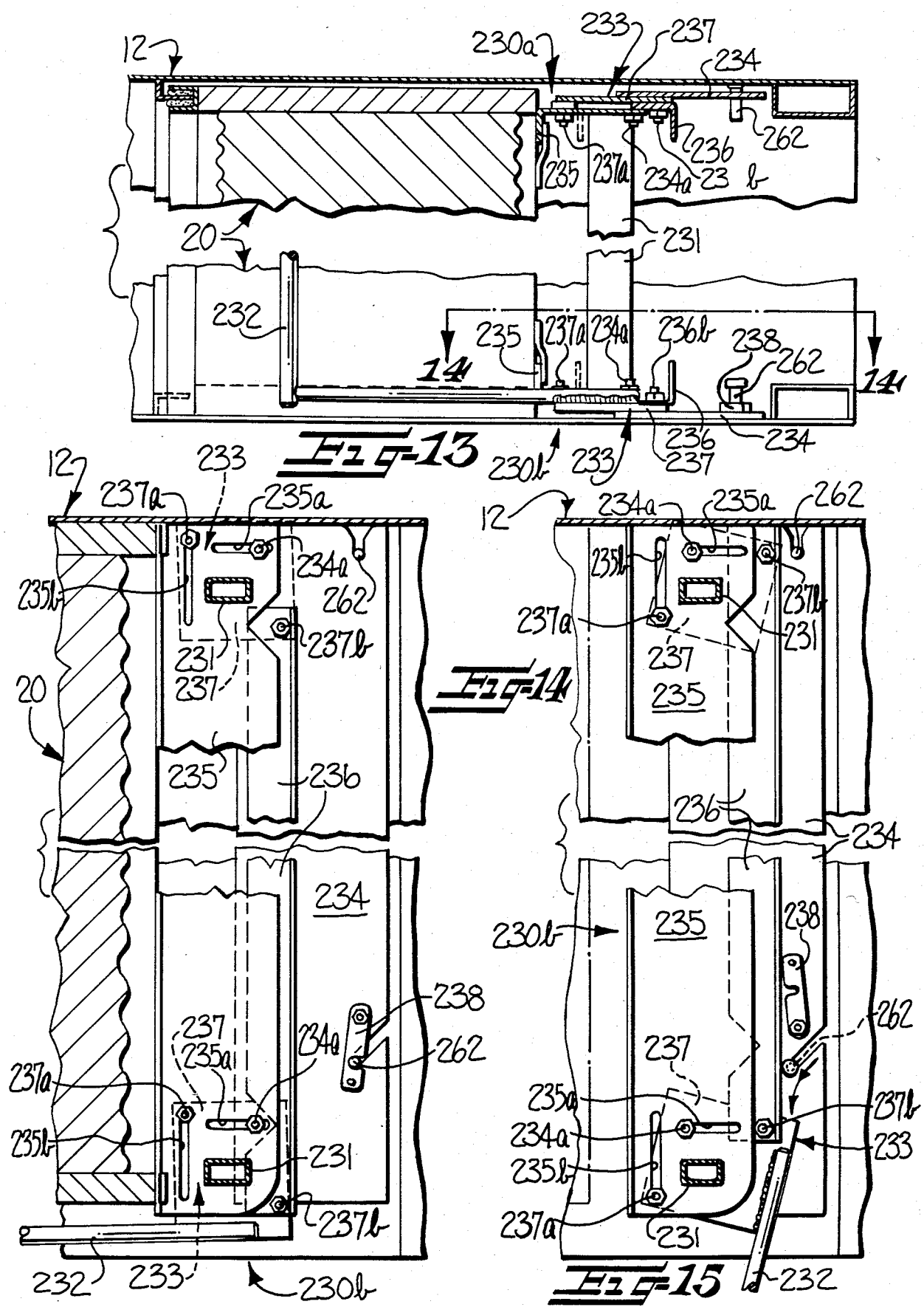

HOUSING FOR HIGH EFFICIENCY PARTICULATE AIR FILTERS

The present invention relates to a housing for high efficiency particulate air filters of the type adapted for the containment of potentially harmful materials in exhaust air duct systems, so as to prevent the release of such materials to the atmosphere.

Filter housings of the described type typically have a rectangular box-like configuration, and include a side access opening in one wall for receiving the filters into the interior of the housing, or removing the dirty and potentially contaminated filters therefrom, with the opening being normally closed by a removable door. In such containment applications, it is necessary to provide a method for the removal and replacement of contaminated filters without direct operator contact with the filters. For this purpose, a peripheral flange is mounted to surround the side opening in the housing, with the flange being designed to mount the open end of a heavy duty plastic bag. Thus, when the door of the housing is removed for filter removal, the bag serves as a barrier between the operator and the contaminated filter. By working through the bag, the operator can unseat the filter and draw it into the bag without direct contact. The bag is then tied off at a location between the filter and the door opening, by either clamping or heat sealing the bag at two closely spaced locations, and the bag is then severed between such clamped or sealed locations. The separated bag portion and enclosed filter may then be removed for disposal. Next, the new filter is placed in a new bag, and the open end of the new bag is then mounted on the flange of the side access opening. The sealed stub of the old bag which remains on the flange is dropped into a new bag, and as a final step, the new filter is moved through the opening and into the housing. This procedure is well known in the art, and is commonly referred to as the bag-in, bag-out procedure.

Present housings of the described type also usually incorporate a clamping assembly which is designed to seat and unseat each of the filters against its seal. In one prior housing, the clamping assembly comprises a pair of filter clamping mechanisms extending respectively along the upper and lower housing side walls, and each mechanism includes a pair of elongate bars which are interconnected by a number of pivotal linkages so as to permit the lateral separation between the bars to be varied. A locking handle is pivotally mounted at the door opening of the housing for rotation about an axis extending between the two mechanisms, and a linkage interconnects the handle to one of the bars of each mechanism, and such that rotation of the handle results in such one bar of each mechanism moving longitudinally, and the other bar of each mechanism moving laterally toward or away from the filters.

The failure or breakage of any component of the above described clamping assembly causes serious problems in those instances where the housing has become contaminated, since any repair must then be effected while working through the plastic bag. As will be apparent, the bag complicates the introduction of tools into the housing, and the tools are difficult to grip and manipulate. Also, the tools are then subjected to the contamination, which requires that they be bagged-out and discarded. Still further, the malfunctioning component may be inaccessible from the door, which may render the entire filter housing and duct system unusable.

It is accordingly an object of the present invention to provide a filter housing of the described type which effectively avoids the above problems associated with the failure of a component of the clamping assembly in a contaminated housing.

It is a more particular object of the above invention to provide a filter housing of the described type and which includes a clamping assembly which can be entirely removed from the housing for repair, or totally replaced with a new assembly.

It is still another object of the present invention to provide a clamping assembly which can be entirely removed from the housing, and wherein a new mechanism can be inserted into the housing in a manner similar to the known filter bag-in, bag-out procedure.

It is a further object of the present invention to provide a release mechanism for a removable clamping assembly in a filter housing, and which will not release in the event the operator should accidentally pull down on the handle of the mechanism as a result of a slip or fall.

These and other objects and advantages of the present invention are achieved in the embodiments illustrated herein by the provision of a filter housing wherein the filter clamping assembly comprises a pair of clamping mechanisms, with each mechanism including a mounting plate having a length sufficient to extend substantially across the side wall of the housing adjacent the door, and a pressure bar mounted to the mounting plate for movement in a direction laterally with respect to the length direction of the mounting plate. Actuating means, such as a pivotable handle, is operatively connected to each clamping mechanism for selectively moving the pressure bars, and means are provided for releasably mounting each of the clamping mechanisms to the opposite side walls adjacent the door, and such that the clamping assemblies and actuating means may be selectively removed from the interior of the housing.

In one embodiment, the two clamping mechanisms are free of any permanent interconnection therebetween, and the actuating handle is releasably connected to each clamping mechanism, so that the two clamping mechanisms and the handle may be individually removed from the housing.

In another embodiment, bracket means are provided which permanently interconnect the two clamping assemblies, and the handle is fixedly connected to the two mechanisms, so that the entire clamping assembly may be removed as a unit.

Some of the objects having been stated, other objects and advantages will appear as the description proceeds, when taken in connection with the accompanying drawings in which FIG. 1 is a perspective view of a filter housing embodying the features of the present invention;

FIG. 2 is a sectional top plan view of the housing shown in FIG. 1;

FIG. 3 is fragmentary perspective view of one of the anchor posts in the housing;

FIG. 4 is a side elevation view of the housing, with the door removed, and with the clamping assembly in its operative position;

FIG. 5 is an enlarged sectional end elevation view of the housing as shown in FIG. 4;

FIG. 6 is an exploded perspective view of the two clamping mechanisms and actuating handle of the housing;

FIG. 7 is a fragmentary sectional view of the pivot rod of the handle;

FIG. 8 is a perspective view of the end of one clamping mechanism adjacent the side opening of the housing, together with a portion of the locking handle;

FIG. 9 is a perspective view similar to that of FIG. 8 but illustrating a further embodiment of a clamping mechanism in accordance with the present invention;

FIG. 10 is a fragmentary sectional view of the release pin and taken along the line 10—10 of FIG. 8;

FIG. 11 is a perspective view of a filter housing which incorporates a further embodiment of the invention;

FIG. 12 is a fragmentary exploded perspective view of one of the clamping mechanisms of the embodiment of FIG. 11;

FIG. 13 is a partly sectioned end elevation view of the housing of FIG. 11;

FIG. 14 is a sectional plan view taken substantially along the line 14—14 of FIG. 13, and illustrating the clamping mechanism in its expanded position; and FIG. 15 is a view similar to FIG. 14 but illustrating the clamping mechanism in its withdrawn position.

Referring more specifically to the drawings, a preferred embodiment of the present invention is illustrated in FIGS. 1-8, and includes a housing 12 which is adapted to form a part of an air duct system, such as an exhaust air cleaning system in a nuclear fuel manufacturing facility or a nuclear power plant. The housing 12 comprises a generally box-like enclosed rectangular structure having a first pair of opposite side walls 14 and 15, and a second pair of opposite side walls 16 and 17 which form the top and bottom of the housing as it is illustrated in FIG. 1. Also, the housing includes an open forward end which is adapted to be joined to an adjacent air duct 19, and an opposite open rear end which is also adapted to be joined to an adjacent duct (not shown), with the front and rear ends defining the air flow direction therebetween.

In the illustrated embodiment, the housing 12 mounts two conventional filters 20 (FIG. 5) in a side by side relationship. Typically, each filter 20 is about 24×24×12 inches in size, and it comprises a wooden or chipboard frame 21 surrounding and supporting a pleated filtering media 22, such as a non-woven fiberglass sheet material. Filters of this type have extremely high dust retention characteristics, usually greater than about 95 percent efficiency, and typically 99.97 percent efficiency, in removing particles of 0.3 microns and larger. Such filters are known as "absolute" or high efficiency particulate air (HEPA) filters in the art.

The filters 20 are adapted to be inserted and removed from the housing 12 through a side access opening 24 in the side wall 14, with the opening 24 normally being closed by the removable door 25. Also, conventional sealing means is provided in the housing 12 for sealably mounting each of the filters therein. This sealing means may include a resilient gasket on the front peripheral face of the filter frame 21, which contacts a mating flange in the housing. Alternatively, a fluid type seal may be employed such as shown at 26, and as further described in U.S. Pat. No. Re. 27,701 to Allan et al. The housing 12 further includes a "bag-out" flange 28 about the access opening 24, to permit the filters to be enclosed in a plastic bag 29 while being removed from the housing and thereby avoid possible contamination, in the manner described above.

The filter housing 12 also includes a filter clamping assembly in the interior of the housing for seating and unseating each filter against its seal. The filter clamping assembly comprises a pair of filter clamping mechanisms 30a, 30b which extend transversely across the top and bottom side walls 16, 17 of the housing respectively, and which are generally aligned with each other and with the opening. Actuating means in the form of a rotatable handle 32 is also positioned within the housing and adjacent the opening for concurrently actuating both of the mechanisms, to either press the filters against their seal, or withdraw the filters from the seal to permit their removal.

Each of the clamping mechanisms 30a, 30b comprises a mounting plate 34 which extends along its full length, and which generally corresponds to the transverse length of the top and bottom side walls 16 and 17 of the housing. The mounting plate 34 mounts a pair of parallel elongate bars, namely, a pressure bar 35 which is adapted to contact the adjacent filter, and a control bar 36. The bars are interconnected by a number of pivotal linkages 38, so as to permit the lateral separation between the bars to be varied, while maintaining their parallel relationship. The linkages 38 are composed of two pivotally connected arms 39, 40, and the arm 39 is connected to the bottom plate by a pivot pin 42, so as to interconnect the bars to the plate.

As best seen in FIG. 5, the bars 35, 36 are each in the form of a right angle in cross section, with the pressure bar 35 including an upright flange 43 which is adapted to be slideably received inside the clips 44 which are fixed to the rear side of the filters 20. Thus when the filters are inserted through the opening 24 in the housing, they are aligned along the bar 35 so that the flange 43 is received inside the clips 44. Subsequent lateral movement of the bar 35 by actuation of the mechanism thereby results in a corresponding movement of the filters, to either seat or unseat the filters from their seals.

The handle 32 of the clamping assembly includes a pivot rod 46 which is mounted in the housing for rotation about an axis extending between the mechanisms 30a, 30b and adjacent one side of the door opening 24. Linkage means operatively interconnects the control bar 36 of each mechanism with the pivot rod 46 of the handle, whereby pivotal movement of the handle acts to concurrently actuate both of the mechanisms 30a, 30b by changing the lateral separation between the bars of the mechanisms. This linkage means includes a lever arm 48 fixed at each end of the rod 46, and an adjustable linkage 49 secured to the bar, note FIG. 8. A removable pin 50 interconnects the lever arm 48 and the linkage 49 in the manner best seen in FIG. 10. The linkage 49 includes a pair of segments 52, 53 which are threadedly interconnected, whereby the length thereof may be adjusted by rotating one segment with respect to the other segment when the lever arm 48 is disconnected therefrom. This adjustment permits the effective lateral travel of the bar 35 with respect to the bar 36 to be adjustable.

To mount the handle 32 in the housing, there is provided a socket 54 fixed to the end of each bottom plate 34 of each mechanism, with the two sockets being aligned and adapted to receive the ends of the pivot rod 46 therebetween. As best seen in FIGS. 7 and 8, the pivot rod 46 is composed of two segments 46a and 46b, and it further incorporates a spring extension 55 which includes a slotted sleeve 56 mounted to the segment 46a of the rod. A spring 57 and the other segment 46b of the rod are received in the sleeve, and a transverse pin 58 is fixed to the segment 46b and is received in the slot of the sleeve, to thereby retain the other rod segment 46b in the sleeve, while permitting relative axial movement between the segments 46a and 46b. Thus, the axial length of the rod 46 may be selectively shortened so that the pivot rod may be released from the sockets 54 by shortening the axial length thereof. The housing also mounts a latch 59 (FIG. 4) at the side of the opening opposite the sockets 54, for releasably engaging the outer portion of the handle when the handle is in the rotational position resulting in maximum separation of the bars 35, 36.

In accordance with an important aspect of the present invention, each of the clamping mechanisms 30a, 30b is releasably mounted to its associated housing side wall 16 and 17, respectively. The means for releasably mounting each clamping mechanism includes a plurality of separate spaced apart apertures 60 formed in the mounting plate 34, and a corresponding number of aligned posts 62 fixedly mounted to each of the top and bottom side walls 16 and 17 of the housing, with the posts 62 being spaced apart a distance conforming to the spacing of the apertures 60 in the bottom plate and being sized to be received through the apertures. Also, the posts are of generally L-shape (note FIG. 3), and include a lip 63 disposed parallel to and spaced from the associated housing wall. The lips 63 of the posts are correspondingly oriented, and they include a cam surface 64 facing the adjacent side wall for camming the mounting plate 34 of the mechanism into firm contact with the wall during the assembly procedure as hereinafter further described.

The housing 12 further incorporates at least one support arm 66 fixedly mounted in the housing and adjacent the clamping mechanism 30a. The support arm 66 is inwardly spaced from the clamping mechanism, i.e., it is spaced just below the mechanism 30a in the illustrated embodiment, and such that the arm is adapted to receive and support the clamping mechanism 30a immediately below its mounted position during the assembly and disassembly procedures.

To now more fully describe the assembly and disassembly procedures of the embodiment of FIGS. 1-8, it will be assumed that it is desired to replace the upper mechanism 30a. In this case, the operator initially removes the door 25, and by working through the bag 29, the latch 59 is released and the handle 32 is pulled forwardly to rotate the pivot rod and cause the bars 35, 36 to move toward each other and thereby withdraw both filters 20 from their seals. The filters are then bagged out by the normal procedure.

With the filters removed from the housing and the opening again being covered by a new bag, the operator works through the new bag and removes each of the two pins 50 to disconnect the lever arms 48 from their linkages 49. He then pushes up on the handle 32 to compress the spring extension 55 and shorten the rod 46 and thereby release the lower segment 46a of the rod from its socket 54. The handle 32 thus becomes free, and may be temporarily laid inside the housing, or placed in the bag. Next, the mechanism 30a is drawn toward the opening to release the interconnection of the posts 62 with the edges of the apertures 60, and the mechanism 30a is then free to drop onto the support arm 66. The mechanism 30a may then be bagged out by the normal procedure, and a new mechanism may be bagged in and assembled by a reversal of the described steps. As will be understood, the mechanism 30b may be similarly released and removed, except that the mechanism 30b will not drop during the removal operation. Rather, the operator should rotate the mechanism 30b onto one side edge a sufficient distance to separate the posts 62 from the apertures 60 and so that the mechanism may be drawn forwardly through the door opening. It will also be understood that if the handle itself is defective, it can be removed with one or both of the mechanisms, or by itself.

It will also be noted that the placement of the spring extension 55 adjacent the upper end of the pivot rod 46 will prevent the inadvertent release of the handle from its mounting sockets 54 in the event the operator should accidentally pull down on the handle as a result of a slip or a fall.

FIG. 9 illustrates a modified embodiment of the clamping assembly in accordance with the present invention. This assembly includes a removable mechanism 130, which includes a mounting plate 134, parallel pressure and control bars 135, 136, and a linkage 138 interconnecting the bars. The linkage 138 includes an L-shaped arm 139 which is pivotally connected to the bar 136 and to the mounting plate 134, and a tubular second arm 140 pivotally interconnecting the arm 139 and the bar 135. More particularly, the tubular arm 140 has a slot 142 in the side wall which receives one end 139a of the arm 139, and a pair of aligned slots 143 which receive a pin 139b fixed to the end 139a within the arm 140. A transverse pin 144 is fixed to the bar 135 and extends through the other end of the tubular arm 140. Also, a spring 145 is mounted in the tubular arm 140 between the end 139a of the arm 139 and the pin 144, and so as to resiliently bias the pin 144, and thus the bar 135, whenever the arm 136 is drawn to the right as seen in FIG. 9.

The means for actuating the mechanism 130 comprises a threaded rod 146 which is rotatably mounted to a plate 147 at the end of the mechanism adjacent the opening 24, and a cooperating threaded block 148 which is pivotally be releasably engaged by a mating wrench 154. Thus rotation of the wrench causes rotation of the rod 146, which in turn longitudinally moves the control bar 136 and laterally moves the pressure bar 135. The spring 145 provides a resilient interconnection between the two bars, which resiliently resists lateral movement of the bars toward each other, and thereby results in a resilient biasing force being applied against the adjacent filter, which is particularly useful where the filter is of the type having a pressure type gasket seal at its opposite face. The mechanism 130 is removably mounted in the housing by an arrangement equivalent to that described above.

FIGS. 11 through 15 illustrate a further preferred embodiment of the invention, and wherein the entire clamping assembly comprises permanently interconnected components. As will become apparent, this embodiment has the advantage of a smaller number of components, and it may be readily designed and constructed to accommodate different filter sizes or styles in the housing. Thus where it is desired to change the size or style of the filter, the original clamping assembly may be removed and a new assembly configured for the new filter may be readily installed.

The clamping assembly of FIGS. 11-15 includes a pair of clamping mechanisms 230a and 230b, each of which includes a mounting plate 234 and a pressure bar 235. The two pressure bars 235 of the two mechanisms are rigidly interconnected by a pair of bridging brackets 231. Each clamping mechanism includes actuating means for selectively moving the two pressure bars 235 in unison between laterally extended and withdrawn positions with respect to the mounting plates 234. This actuating means includes a pair of longitudinally separated linkage assemblies 233 associated with each clamping mechanism, with each linkage assembly 233 comprising a transverse slot 235a and a separate longitudinal slot 235b in the pressure bar 235, a threaded pin 234a fixed to the mounting plate and extending through the associated transverse slot 235a, and a linkage plate 237 pivotally mounted to the mounting plate for pivotal rotation about the axis of the post 234a. A second threaded pin 237a is fixed to the linkage plate 237 and extends through the longitudinal slot 235b.

A control bar 236 interconnects the two linkage plates 237 of each clamping mechanism by means of the pin 237b mounted on each plate, so that the plates may be concurrently rotated about their respective pivotal axes defined by the pins 234a. A handle 232 is fixedly connected to the two corresponding linkage plates 237 of the two mechanisms, and such that pivotal movement of the handle causes a corresponding pivotal movement of all four linkage plates about their respective axes and lateral movement of each pressure bar 235 by reason of the interengagement of the pin 237a in the slot 235b, note FIGS. 14 and 15.

The clamping assembly is releasably mounted in the housing adjacent the door by an arrangement which includes a pair of anchor posts 262 fixed to each of the top and bottom walls inside the housing. In addition, each mounting plate 234 includes an end slot 234b for slideably receiving one post, and an edge slot 234c for slideably receiving the other post. The mounting plate further includes a pivotable latch 238 for locking beneath the head of the associated post 262 when the assembly is in its operative position.

To remove the assembly, the latches 238 for each clamping mechanism 230, 230b, are released, and the front of the assembly is then moved laterally to slide the mounting plates free of the posts 262 which are in the slots 234a. Next, the entire assembly may be drawn outwardly through the door. To replace the assembly, the procedure is simply reversed.

In the drawings and specification, there has been set forth preferred embodiments of the invention, and although specific terms are employed, they are used in a generic and descriptive sense only and not for purposes of limitation.

That which is claimed is:

1. In a rectangular filter housing comprising two pairs of opposite side walls, open front and rear ends defining the air flow direction therebetween, a side access door opening in one of said side walls for receiving at least one filter into the interior of the housing and subsequently removing the filter therefrom, sealing means in the housing for engaging one face of each filter therein, and a filter clamping assembly adapted for seating and unseating each filter against said sealing means, the improvement wherein said filter clamping assembly is releasable and removable from the housing to thereby facilitate its repair or replacement, and comprises a pair of clamping mechanisms, with each of said mechanisms including (a) a mounting plate having a length sufficient to extend substantially across the side wall of the housing adjacent said door, and (b) a pressure bar mounted to said mounting plate for movement in a direction laterally with respect to the length direction of said mounting plate and between a laterally extended position and a laterally withdrawn position, actuating means operatively connected to each clamping mechanism for selectively moving the associated pressure bar laterally between said extended and withdrawn positions, and means releasably mounting each of said clamping mechanisms to respective ones of the two opposite side walls adjacent said door opening and so that said mechanisms extend transversely across the interior of the housing in general alignment with the door opening, said mounting means including at least one post fixed to each associated side wall of the housing, and an aperture in each mounting plate for receiving said post, whereby each of said clamping mechanisms and said actuating means may be selectively removed from the interior of the housing.

2. The filter housing as defined in claim 1 wherein each of said clamping mechanisms further includes a control bar disposed generally parallel to said pressure bar, a plurality of pivotal linkages interconnecting said control bar and said pressure bar so as to permit the lateral separation thereof to be varied while maintaining their parallel relationship, and means pivotally mounting each of said linkages to said mounting plate.

3. The filter housing as defined in claim 2 wherein said actuating means comprises a handle having a pivot rod extending between said pair of clamping mechanisms, and means releasably interconecting said pivot rod to said control bar of each of said clamping mechanisms, such that rotation of said handle about the axis of said pivot rod causes said control bar to move longitudinally and said pressure bar to move laterally, and whereby said handle may be separately removed from said housing.

4. The filter housing as defined in claim 3 wherein said pair of clamping mechanisms are free of any permanent interconnection therebetween, and such that the two clamping mechanisms and said handle may be individually removed from said housing.

5. The filter housing as defined in claim 2 wherein said actuating means comprises a first threaded member rotatably mounted at one end of said mounting plate of each clamping mechanism, and a cooperating second threaded member operatively connected to said control bar of each clamping mechanism, whereby rotation of the first threaded member causes generally longitudinal movement of said control bar and lateral movement of said pressure bar.

6. The filter housing as defined in claim 2 wherein each of said pivotal linkages of each clamping mechanism incorporates spring biasing means for resiliently resisting lateral movement of said bars toward each other, and such that said pressure bar is adapted to resiliently bias each filter against said sealing means in said housing.

7. The filter housing as defined in claim 1 wherein said actuating means comprises a pair of longitudinally separated linkage assemblies associated with each clamping mechanism, with each linkage assembly comprising
  (a) a transverse slot and a separate longitudinal slot in said pressure bar,
  (b) a first pin fixed to said mounting plate and extending through the associated transverse slot,
  (c) a linkage plate pivotally mounted to said mounting plate for rotation about an axis parallel to that of said mounting plate pin,
  (d) a second pin fixed to said linkage plate and extending through the associated longitudinal slot,
bar means interconnecting the two linkage plates of each clamping mechanism for concurrent rotation about their respective pivotal axes, and
a handle fixedly interconnecting two corresponding linkage plates of the two clamping mechanisms,
whereby pivotal movement of said handle causes a corresponding pivotal movement of all four linkage plates of the two clamping mechanisms about their respective axes and lateral movement of each pressure bar.

8. The filter housing as defined in claim 7 wherein the pivotal axis of each of said linkage plates corresponds to the axis of said mounting plate pin.

9. The filter housing as defined in claim 8 further comprising bracket means rigidly interconnecting either the two mounting plates or the two pressure bars of the two clamping assemblies.

10. In a filter housing having two pairs of opposite side walls, open front and rear ends defining the air flow direction therebetween, a side access door opening in one side wall for receiving at least one filter into the interior of the housing and subsequently removing the filter therefrom, sealing means in the housing for engaging one face of each filter therein, and a filter clamping assembly in the housing for moving each filter toward and away from said sealing means so as to seat and unseat each filter against said sealing means, said filter clamping assembly comprising a pair of filter clamping mechanisms extending transversely across respective opposite side walls of the housing and generally aligned with each other and with said opening, and actuating means positioned within the housing and adjacent the door opening for concurrently actuating both of said mechanisms, the improvement wherein said actuating means comprises a handle having a pivot rod, and further comprising
  means releasably connecting the ends of said handle pivot rod to respective ones of said clamping mechanisms and such that the handle may be released from all connection with said housing, and
  means releasably mounting each of said clamping mechanisms to its associated housing side wall,
whereby the entire clamping assembly may be disassembled and entirely removed through the opening by a technician working through said opening, by releasing the connection between the ends of said handle pivot rods and each of said clamping mechanisms, and then releasing the mounting of each of said clamping mechansims, and such that the actuating means and each of said clamping mechanisms may be withdrawn through said opening.

11. The filter housing as defined in claim 10 wherein said means releasably connecting each of the ends of said handle pivot rod to respective ones of said clamping mechanisms comprises a socket fixedly mounted on each clamping mechanism for receiving the end of the pivot rod therein, and spring extension means for permitting the axial length of said pivot rod to be selectively shortened so that said pivot rod may be released from said sockets by shortening the axial length of said rod.

12. The filter housing as defined in claim 10 wherein each of the clamping mechanisms comprises a mounting plate extending along the length thereof, and wherein said means releasably mounting each of said clamping mechanisms to its associated housing wall comprises a plurality of separate spaced apart apertures formed in said mounting plate of each clamping mechansim, and a corresponding number of L-shaped posts fixedly mounted to each of said opposite side walls of said housing, with said posts being positioned so as to be received through respective apertures in said mounting plate and overlie a portion of said bottom plate.

13. In a filter housing having an opening in one side wall for receiving at least one filter into the interior of the housing and subsequently removing the filters therefrom, sealing means in the housing for engaging one face of each filter therein, and a filter clamping assembly in the housing for seating and unseating the filter against said sealing means, said filter clamping assembly comprising a pair of clamping mechanisms extending transversely across respective opposite side walls of the housing and generally aligned with said opening, each mechanism comprising a pair of parallel elongate bars which are interconnected by a number of pivotal linkages so as to permit the lateral separation between the bars to be varied, a locking handle including a pivot rod, means pivotally mounting each of the ends of said handle for rotation about an axis extending between said mechanisms and adjacent said door opening, and linkage means operatively interconnecting one of said bars of each mechanism with said handle whereby pivotal movement of said handle about said axis acts to concurrently actuate both of said mechanisms by changing the lateral separation between said bars of the mechanisms, the improvement wherein
  each of said clamping mechanisms further comprises a mounting plate extending along the length thereof, with said pivotal linkages being pivotally mounted to said mounting plate,
  said means pivotally mounting each of the ends of said handle includes means fixed to each of said mounting plates releasably engaging the ends of said handle pivot rod,
  said linkage means is releasably connected to each clamping mechanism, and further comprising
  means releasably mounting each of said clamping mechanisms to its associated housing side wall, and comprising a plurality of separate spaced apart apertures formed in said mounting plate, and a corresponding number of aligned posts fixedly mounted to said side wall, and with said posts being spaced apart a distance conforming to the spacing of said apertures in said mounting plate and being sized to be received through said apertures,
  whereby the clamping assembly may be disassembled and entirely removed through the opening by a technician working through said opening, by releasing the connection between said linkage means and each clamping mechanism, releasing the ends of said handle pivot rod, and then releasing each of said clamping mechanisms from its associated housing side wall.

14. The filter housing as defined in claim 13 wherein said posts each include a lip disposed parallel to and spaced from the adjacent housing side wall, and said posts are correspondingly oriented, whereby each clamping mechanism may be mounted to its associated side wall by positioning the clamping mechanism along a line overlying the posts, and moving the clamping mechanism so that the posts extend through respective apertures and the lips of the posts each overlie the adjacent portion of the mounting plate, and whereby the mechanism may be released by reversing the above procedure, and each post includes a cam surface facing the adjacent housing side wall for camming the mounting plate into contact with the side wall during the assembly procedure.

15. The filter housing as defined in claim 13 further comprising at least one support arm fixedly mounted in said housing, with said support arm being inwardly spaced from one clamping mechanism, and such that when the housing is oriented with such one clamping mechanism at the top of the housing, the support arm will be adapted to receive and support the clamping mechanism immediately below its mounted position during the assembly and disassembly procedures.

16. In a rectangular filter housing comprising two pairs of opposite side walls, open front and rear ends defining the air flow direction therebetween, a side access door opening in one of said side walls for receiving at least one filter into the interior of the housing and subsequently removing the filter therefrom, sealing means in the housing for engaging one face of each filter therein, and a filter clamping assembly adapted for seating and unseating each filter against said sealing means, the improvement wherein said filter clamping assembly is releasable and removable from the housing to thereby facilitate its repair or replacement, and comprises a pair of clamping mechanisms, with each of said mechanisms including (a) a mounting plate having a length sufficient to extend substantially across the side wall of the housing adjacent said door,
(b) a pressure bar extending along the length direction of said mounting plate,
(c) a control bar disposed generally parallel to said pressure bar,
(d) a plurality of pivotal linkages interconnecting said control bar and said pressure bar so as to permit the lateral separation thereof to be varied while maintaining their parallel relationship,
(e) means pivotally mounting each of said linkages to said mounting plate, actuating means operatively connected to said control bar of each clamping mechanism for selectively moving the associated pressure bar laterally between an extended and a withdrawn position, and means releasably mounting each of said clamping mechanisms to respective ones of the two opposite side walls adjacent said door opening and so that said mechanisms extend transversely across the interior of the housing in general alignment with the door opening, said mounting means including means fixed to each associated side wall of the housing for releasably engaging the outer surface of the associated mounting plate, whereby each of said clamping mechanisms and said actuating means may be selectively removed from the interior of the housing.

17. The filter housing as defined in claim 16 wherein said actuating means comprises a handle having a pivot rod, and means releasably connecting the ends of said pivot rod to respective ones of said control bars of said clamping mechanisms.

18. The filter housing as defined in claim 17 further comprising means releasably and pivotally connecting the ends of said pivot rod to respective ones of said mounting plates of said clamping mechanisms.

* * * * *